Dec. 26, 1950     H. H. KERSTEN     2,535,580
SELF-SEALING SPHERICAL MIXING VALVE
Filed Nov. 10, 1947
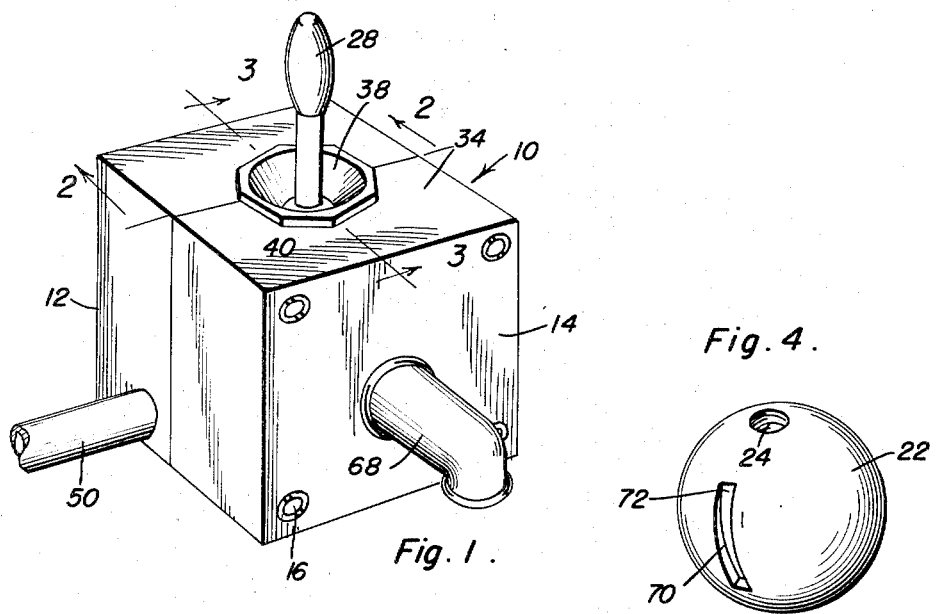
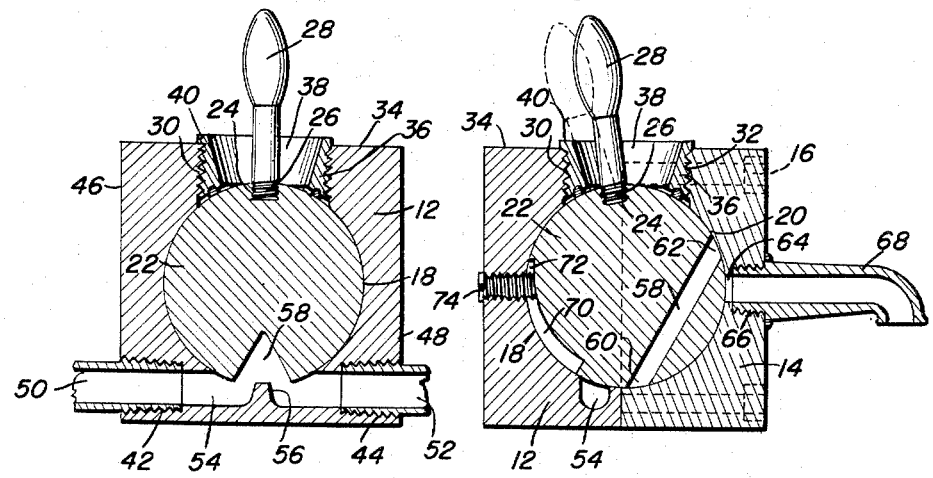
Herbert H. Kersten
INVENTOR.

Patented Dec. 26, 1950

2,535,580

UNITED STATES PATENT OFFICE 2,535,580

SELF-SEALING SPHERICAL MIXING VALVE

Herbert H. Kersten, Iowa City, Iowa

Application November 10, 1947, Serial No. 785,153

4 Claims. (Cl. 251—91)

This invention relates to new and useful improvements in mixing valves and the primary object of the present invention is to provide a self-sealing spherical valve for mixing two fluids in any desired proportions at varying velocities of flow.

Another important object of the present invention is to provide a mixing valve including novel and improved means for urging the valve in a closed and sealed position when the same is not in use, and for providing also a unique means of adjustment of the sealing device which will permit maintenance of a tight seal even after the valve has become worn by prolonged use, thus eliminating the tendency of the ball-type valve to leak.

A further object of the present invention is to provide a housing having a pair of inlets, a single outlet and a single valve for selectively controlling the flow of fluid from the inlets to the outlet whereby the same may replace the heretofore conventional dual valve construction for hot and cold water spigots.

A still further aim of the present invention is to provide a self-sealing spherical mixing valve that is simple and practical in construction, strong and reliable in use, neat and attractive in appearance, relatively inexpensive to manufacture, all parts of which are quickly and readily assembled or disassembled, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present valve construction applied to an inlet pipe, and with parts of the pipe broken away and shown in section;

Figure 2 is a vertical sectional view of taken substantially on the plane of section line 2—2 of Figure 1, and showing the valve in an open position;

Figure 3 is a vertical sectional view taken at right angles to Figure 2 and substantially on the plane of section line 3—3 of Figure 1, and showing the valve in a closed position; and, Figure 4 is a perspective view of the valve used in conjunction with the present invention.

Referring now to the drawings in detail, wherein for the purpose of illustration, there is disclosed a preferred embodiment of the present invention, the numeral 10 a substantially block housing generally of any suitable material which includes a pair of complemental halves 12 and 14 that are retained in juxtaposition by removable fasteners 16.

Semi-spherical opposed recesses or valve seats 18 and 20 are provided in the central portions of the halves 12 and 14, and frictionally engage a spherical valve 22 having an internally threaded aperture 24 that receivably engages the threaded end 26 of a handle 28 the longitudinal axis of which aligns the center of the valve.

Receivably engaging complemental semi-circular internally threaded openings 30 and 32 provided in one side 34 of the housing 10, is an externally threaded sleeve 36 having a smooth tapered inner surface 38 and a preferably hexagonal flanged portion 40 that bears upon the side of the housing.

Internally threaded ports 42 and 44 are provided in the outer sides 46 and 48 of the half 12 and respectively engage conduits 50 and 52 that communicate with a passage 54 provided in half 12. A baffle 56 integrally formed with half 12 is disposed medially within the passage 54 and intermediate the sides 46 and 48 of half 12.

A substantially V-shaped oblique channel 58 is provided in the valve 22 having an inlet opening 60 that is adapted to communicate with the passage 54 when its outlet opening 62 opposes an internally threaded outlet port 64 provided in half 14 that is disposed at right angles to the passage 54 and in a spaced parallel plane to the latter. This outlet port receivably engages the reduced threaded end 66 of a suitable spigot 68.

A cam surface groove 70 is provided in the valve 22 and its reduced end portion 72 normally engages an adjustable tension screw 74 adjustably carried by half 12 at right angles to the passage 54 and aligning the outlet port 64 when the valve is in a closed position as shown in Figure 3.

When it is desirable to place the valve in an "on" position, the handle may be moved toward the spigot 68 whereby the channel 58 will communicate with the passage 54 and the port 64 effecting a discharge from the spigot. By slowly affecting the movement toward the spigot a desired regulated flow of fluid discharge can be maintained and by moving the handle 28 toward the conduit 50 or 52 the amount of fluid entering the passage 54 from the conduits can be simultaneously controlled.

It should be noted, that as the valve is actuated to an "off" position the fastener 74 will engage the shallow end portion 72 of the cam surfaced groove 70 to insure a tight seat of the outlet opening 62 and the outlet opening 60 against the seat 20 as shown in Figure 3. As the spherical valve 22 becomes worn with use, tension screw 74 may be adjusted to insure that a tight seal will always be maintained about outlet port 64. Similar adjustment of hexagonal flanged portion 40 will compensate for wear on the vertical axis of spherical valve 22, thus continuing the self-sealing effect throughout the life of the valve. Pressure from tension screw 74 and flanged portion 40 on spherical valve 22 also serves to lock the valve when it is in the closed position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A valve structure comprising a housing, a passage in said housing, a spherical seat provided in said housing, a spherical valve positioned in said seat, an oblique channel in said valve, an outlet port provided in said housing, inlet ports communicating with said passage, said channel forming a communication between said outlet port and said passage when the valve is in its open position, means for selectively adjusting said valve in said seat for regulating a flow of fluid from said outlet port and from said inlet ports, said valve having a tapered groove therein, and means carried by the housing and received in said groove for forcing a portion of the valve against the inner walls of said seat as said valve is actuated to a closed position for sealing the outlet end of said channel against the inner walls of said seat.

2. A valve structure comprising a housing, a passage in said housing, a spherical seat provided in said housing, a spherical valve positioned in said seat, an oblique channel in said valve, an outlet port provided in said housing, inlet ports communicating with said passage, said channel forming a connection between said outlet port and said passage when the valve is in its open position, means for selectively adjusting said valve in said seat for regulating a flow of fluid from said outlet port and from said inlet ports, said channel having an outlet end, a cam surfaced groove provided in the outer periphery of said valve having a shallow end, and an adjustable bearing element carried by said housing and received in said groove, said bearing element bearing against the shallow end of said groove during movement of said valve to a closed position for forcing the outlet end of said channel against the inner walls of said seat.

3. In a valve structure including a housing having a valve seat therein, inlet and outlet ports and a valve positioned in the seat and having a delivery channel for registering with and connecting said inlet and outlet ports when the valve is in its open position, said delivery channel having inlet and outlet ends; means for sealing the inlet and outlet ends of said channel against the walls of said seat as said valve is moved to a closed position, said means including a cam surfaced groove provided in said valve and having a shallow end, and an adjustable bearing element carried by said housing and received in said groove, said element bearing against the shallow end of said groove as the valve is moved in a closed position to urge the inlet and outlet ends of said channel against the walls of said seat.

4. The combination of claim 3, wherein said groove is disposed at a diametrically opposite side of said valve from the outlet end of said channel.

HERBERT H. KERSTEN.

REFERENCES CITED

The following references are of record in the file of this patent:

UNITED STATES PATENTS

| Number | Name | Date |
|---|---|---|
| 598,248 | Heindl | Feb. 1, 1898 |
| 1,299,586 | Leibing | Apr. 8, 1919 |
| 1,478,688 | Whidden | Dec. 25, 1923 |
| 1,661,431 | Leibing | Mar. 6, 1928 |
| 2,200,474 | Heggem | May 14, 1940 |